Jan. 7, 1958     F. W. HARRIS     2,819,051
REGENERATIVE MASS AND TILES FOR USE IN SUCH A MASS
Filed May 9, 1955     2 Sheets-Sheet 1
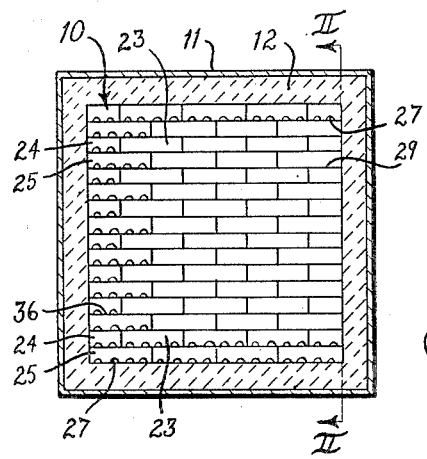
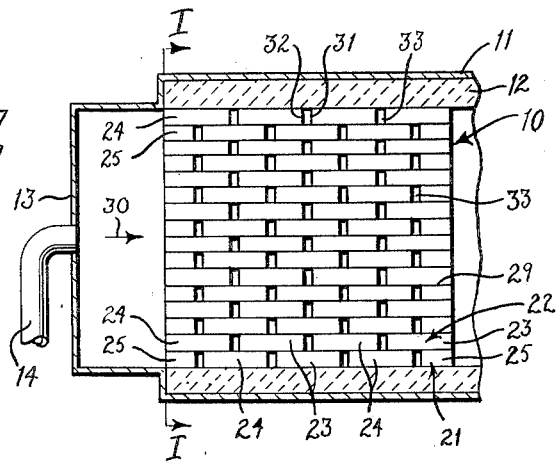
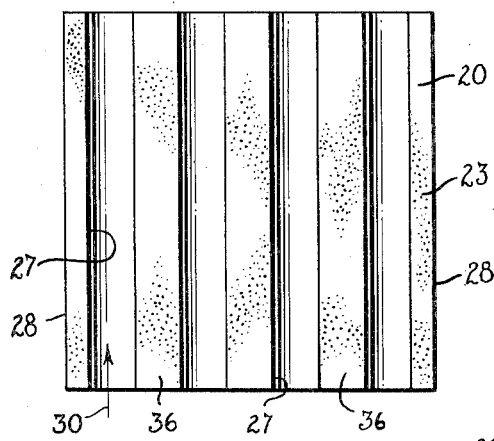
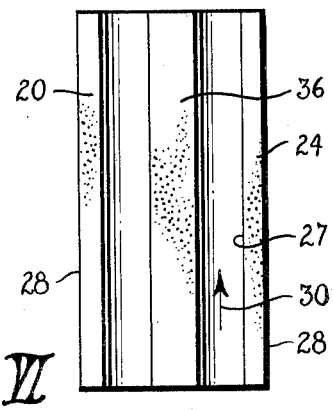
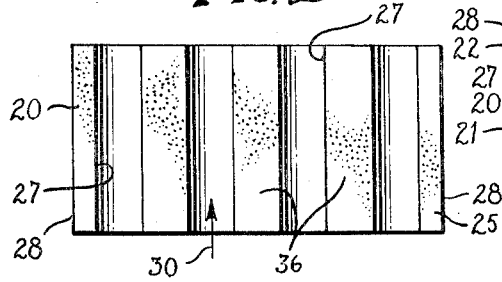
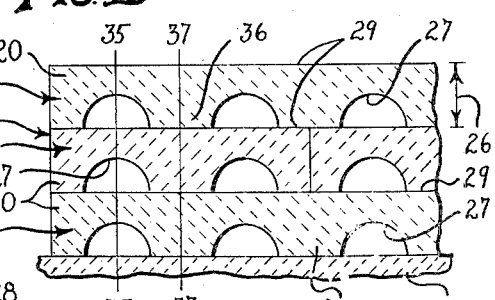
INVENTOR.
FORD W. HARRIS
BY HIS ATTORNEYS
HARRIS, KIECH, FOSTER, & HARRIS

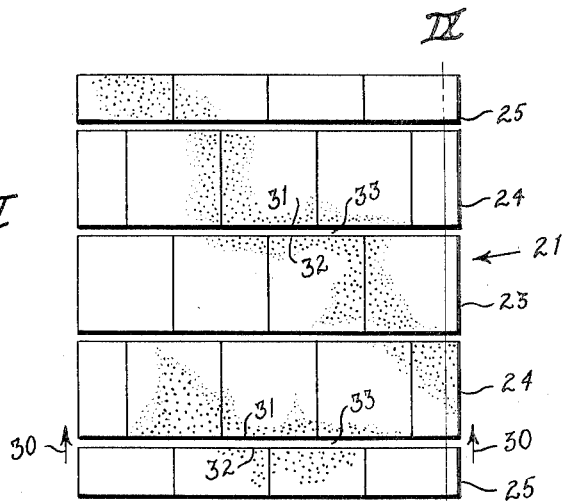
Fig. VII
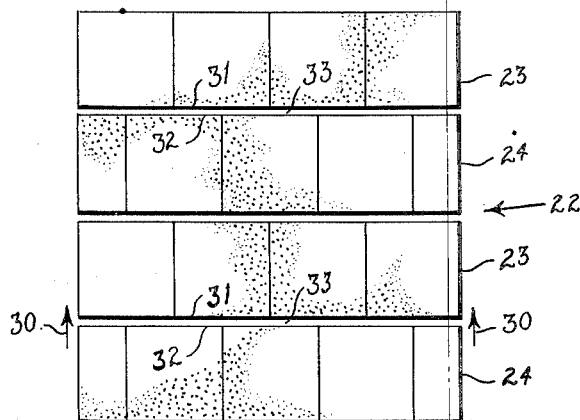
Fig. VIII
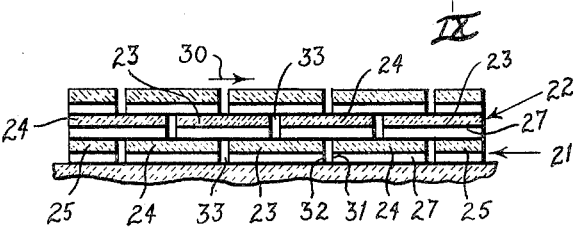
Fig. IX

United States Patent Office 2,819,051
Patented Jan. 7, 1958

2,819,051

REGENERATIVE MASS AND TILES FOR USE IN SUCH A MASS

Ford W. Harris, Los Angeles, Calif., assignor to Wulff Process Company, Huntington Park, Calif., a corporation of California Application May 9, 1955, Serial No. 506,825

4 Claims. (Cl. 263—51)

The invention is briefly summarized and described as embodying a new and useful regenerative mass composed of new and useful tiles which are assembled in a new and useful manner. A regenerative mass is defined as a mass formed of material which is highly refractory to changes by heat and which is highly heat conductive. Such a mass is normally formed of brick or tile so assembled as to provide longitudinal channels through which a hot gas may be passed to store heat in the mass and through which a colder gas may be passed to absorb heat from the mass.

Referring to the drawings, which are for illustrative purposes only:

Fig. I is a cross-section of a preferred form of regenerative mass, the plane of cross-section being shown and defined by the line I—I of Fig. II;

Fig. II is a cross-section of said mass, the plane of cross-section being defined by the line II—II of Fig. I;

Fig. III is a plan view of a full tile;

Fig. IV is a plan view of a long half tile;

Fig. V is a plan view of a shore half tile;

Fig. VI is a cross-section of a part of the mass, the plane of cross-section being defined by the line I—I of Fig. II;

Fig. VII is a plan view of a lower layer of tile;

Fig. VIII is a plan view of a lower layer of tile;

Fig. IX is a cross-section of a portion of the mass, the plane of cross-section being defined by the line IX—IX of Figs. VII and VIII.

The regenerative mass 10 is ordinarily placed in a steel shell 11 having a heat insulating lining 12 extending entirely around the inside of the shell 11, the shell 11 having two closed ends 13 through which gas may be withdrawn or introduced through a pipe 14. The tile 20 are piled up in horizontal layers 21 and 22, the piled up tile resting upon and being supported by the lining 12 which extends along and inside the bottom of the shell. The tile can be readily assembled as shown in Figs. VII, VIII, and IX if three sizes of tile are provided as shown in Figs. III, IV, and V, namely a full tile 23, a long half tile 24, and a short half tile 25. The tile are of uniform thickness 26 and each tile carries on its lower surface a series of grooves 27 which may be semicircular as shown in Fig. VI. These grooves are parallel with each other and with the edges 28 of the tile 20. The lower portion of each groove 27 is closed by the top surface 29 of a next lower tile, the grooves in the bottom tile being closed off by the lining 12 upon which the tile rest. The grooves 27 in the tile 20 extend in the direction of the arrow 30 as applied to the various figures.

Each lower layer 21 is assembled as shown in Fig. VII using full tile 23 and half tile 24 and 25. Each upper layer 22 is assembled as shown in Fig. VIII using full tile 23 and half tile 24. The tile are laid leaving a space 33 between the edges 31 and 32 of adjacent tile in the same layer. When fully assembled the mass has longitudinal channels extending in the direction of the arrows 30 and formed by the channels 27 and cross channels 33 between the edges 31 and 32 of the tile formed by the spaces between the ends of the tile.

The mass is heated preferably by hot gases of combustion supplied through the pipe 14, the gases passing in the direction of the arrows 30 through the channels 27. Gases which have been heated by contact with the mass flowing in a direction contrary to the arrows 30 may be withdrawn through the pipe 14.

The cross channels 33 tend to equalize the flow of gases through the mass. Each cross channel extends completely across the mass and not only connects together all of the channels 27 in a first layer but also connects together all of the channels in the first tile with all of the channels in the next higher layer of tile. The result is that the rate of flow of gas is very uniform throughout the mass.

It will be evident from an inspection of Fig. VI that the channels 27 in one layer 21 are not staggered vertically with the channels 27 in the layer 22, but are directly in a vertical plane indicated by the line 35—35 in Fig. VI. This puts the solid portions 36 of each tile in a vertical plane indicated by the line 37—37 of Fig. VI. This arrangement, combined with the method of laying the tile as above described, produces a solid column of tile material along the plane 37—37 and allows the tile to be piled up on each other very high due to the compressive strength limit of these columns which is very high.

I claim as my invention:

1. In a regenerative mass, a plurality of layers of tile, each tile having a flat, unbroken plane upper surface and a plurality of parallel longitudinal semicircular grooves in the lower surface, each layer consisting of a plurality of said tile disposed side-by-side and abutting, and a plurality of said tile disposed in longitudinal alignment with a transverse space between each two longitudinally-aligned adjoining tile in that layer, the tiles in adjoining layers being staggered longitudinally and transversely, all of said grooves being parallel to each other and parallel to the longitudinal axis of the mass.

2. In a regenerative mass, a plurality of layers of tile, each tile having a length and width substantially greater than its thickness, each tile having a plurality of parallel longitudinal semicircular grooves in one of the larger surfaces thereof, each layer consisting of a plurality of said tile disposed side by side and abutting and a plurality of said tile disposed in longitudinal alignment with a transverse space between each two adjoining tile in that layer, the tiles in adjoining layers being staggered longitudinally and transversely, all of said grooves being parallel to each other and parallel to the longitudinal axis of the mass.

3. In a regenerative mass, a plurality of layers of tile, each tile having a length and width substantially greater than its thickness, each tile having a plurality of parallel longitudinal semicircular grooves in one of the larger surfaces thereof, each of said grooves having a radius substantially one half the thickness of its tile, each layer consisting of a plurality of said tile disposed side by side and abutting and a plurality of said tile disposed in longitudinal alignment with a transverse space between each two adjoining tile in that layer, the tiles in adjoining layers being staggered longitudinally and transversely, all of said grooves being parallel to each other and parallel to the longitudinal axis of the mass.

4. In a regenerative mass, a plurality of layers of tile, each layer including large tile and small tile, each of said tile having top and bottom surfaces and edges and ends, said surfaces having a length and width substantially greater than the thickness of said edges and ends, said small tile having a width substantially one half the width of said large tile, each tile having a plurality of parallel longitudinal semicircular grooves in one of said surfaces and parallel to said edges, each of said small tile having one half the number of grooves of said large tile, each layer consisting of a plurality of said tile disposed side by side and abutting transversely and a plurality of said tile disposed in longitudinal alignment, the tiles in adjoining layers being staggered transversely, all of said grooves being parallel to each other and parallel to the longitudinal axis of the mass.

References Cited in the file of this patent

UNITED STATES PATENTS

| | | |
|---|---|---|
| 1,356,788 | Roberts | Oct. 26, 1920 |
| 1,927,834 | Hughes | Sept. 26, 1933 |
| 2,706,109 | Odman | Apr. 12, 1955 |

FOREIGN PATENTS

| | | |
|---|---|---|
| 76,686 | Denmark | Nov. 16, 1953 |